United States Patent [19]
Shiono et al.

[11] Patent Number: 5,939,159
[45] Date of Patent: Aug. 17, 1999

[54] AQUEOUS RESIN DISPERSION

[75] Inventors: Teruo Shiono; Masami Yamada; Sanji Harada; Masahiro Ihara; Takeshi Tuyama; Tetsuhisa Nakamura, all of Chuo-ku, Japan

[73] Assignee: Toyo Manufacturing Company, Ltd., Tokyo, Japan

[21] Appl. No.: 08/715,312

[22] Filed: Sep. 16, 1996

[51] Int. Cl.$^6$ .................................................. B29D 22/00
[52] U.S. Cl. .................. 428/35.8; 427/239; 427/386; 427/388.4; 428/36.9; 428/36.92; 428/4.8; 523/412; 523/424; 523/406; 523/402
[58] Field of Search .................... 523/402, 424, 523/412, 406; 524/508, 510, 540, 541; 427/239, 386, 388.4; 428/35.8, 36.9, 36.92, 418

[56] References Cited

U.S. PATENT DOCUMENTS

| | | | |
|---|---|---|---|
| 4,104,223 | 8/1978 | Hosoda et al. | 523/402 |
| 4,212,781 | 7/1980 | Evans et al. | 523/402 |
| 4,599,371 | 7/1986 | Loch et al. | 523/402 |
| 4,740,536 | 4/1988 | Chao | 523/402 X |
| 4,840,990 | 6/1989 | Gullbins et al. | 524/510 X |
| 4,857,566 | 8/1989 | Helbling | 523/409 |
| 4,897,434 | 1/1990 | Shimada et al. | 523/409 |
| 5,001,173 | 3/1991 | Anderson et al. | 523/402 X |
| 5,061,742 | 10/1991 | Miller | 523/402 |
| 5,496,886 | 3/1996 | Counlais | 524/540 |
| 5,548,015 | 8/1996 | Bourlier et al. | 524/508 X |

OTHER PUBLICATIONS

Chemical Abstracts, vol. 109, No, 10. (1988).
Central Patents Index, Basic Abstracts Journal, Section Ch, Week 8651 (1987).

Primary Examiner—Judy M. Reddick
Attorney, Agent, or Firm—David G. Conlin; Christine C. O'Day; Dike, Bronstein, Roberts & Cushman

[57] ABSTRACT

The invention provides an aqueous resin dispersion that comprises 1) an acrylic resin (A), 2) an aromatic epoxy resin (B), and 3) a bisphenol F product (C) that are dispersed in an aqueous medium at a pH of from about 4 to 11. The invention also provides an aqueous base-coat agent, coated substrates and coating methods that comprises the aqueous resin dispersion.

12 Claims, No Drawings

AQUEOUS RESIN DISPERSION

FIELD OF THE INVENTION

This invention relates to an aqueous resin dispersion. The invention also relates to an aqueous base-coat, particularly for metal surfaces, and substrates and methods that comprise the resin composition.

BACKGROUND

Base-coats and paints which mainly contain the aromatic epoxy resin can exhibit good qualities of processing, durability and coating properties. Accordingly, they are used often for coating, especially metal. The aromatic epoxy resin itself, however, can not dissolve and disperse into aqueous solution.

On the other hand, usual base-coats and paints for metal are studied further from the view of resources-saving, energy-saving and preventing environmental pollution. There are various suggestions about base-coats and paints which mainly contain the aromatic epoxy resin. For example, the method for dispersing the aromatic epoxy resin with surfactant into water is well known, but such surfactants tend to impart bad effects on storage stability and other properties of base-coats and paints.

Certain self-emulsive aromatic epoxy resin comprising an aromatic epoxy resin that is modified by acrylic system resin with carboxyl group has been suggested. For example, Japanese Patent Application Laid-Open No. 53-14963 and Japanese Patent Application Laid-Open No. 55-9433 have reported that partial reactant with excess carboxyl groups, which are produced from reacting with acrylic resin and aromatic epoxy resin are dispersed stably with ammonia or amine in aqueous medium, namely the esterification. Japanese Patent Application Laid-Open No. 57-105418 and Japanese Patent Application Laid-Open No. 58-198513 have reported that a low molecular compound is produced by that aromatic epoxy resin reacts partially with methacrylic acid, and comprises epoxy group and acryloyl group in a molecule, and the low molecular compound and monomer mixture containing acrylic acid or methacrylic acid are polymerized, namely the modified esterification, namely the modified esterification, and the produced polymer is neutralized with basic compound, and an aqueous dispersion composition is obtained. Also, Japanese Patent Application Laid-Open No. 53-1228 reports that a polymerized epoxy resin is obtained by polymerizing a monomer mixture including a carboxylic monomer with a free-radical generation agent such as a benzoyl peroxide in the presence of an aromatic epoxy resin, namely the graft copolymerization, and the graft-copolymerized epoxy resin is able to be dispersed stably into an aqueous medium containing base.

Self-emulsive-type aromatic epoxy resin obtained by the above-described documents can form a rigid film by itself because it does not contain a surfactant in paints. But the self-emulsive-type aromatic epoxy resin is mixed with an aqueous amino resin which has a good hardening property in order to achieve increased hardening speed practically. By mixing with the amino resin, a hardening speed of film is able to be improved without deterioration of film property to a certain extent. However, if the amount which can get a practically satisfactory hardening speed is mixed, the processing and adhesion properties can deteriorate. Especially, painting inside a can give rise to sanitation problem because low molecular compounds which originate from amino resin are dissolved into contents of the can during heat sterilization.

Also, it has been reported that a phenol resin is mixed with the self-emulsive-type aromatic epoxy resin; however, such prior efforts have shown that phenol resin can not contribute to improving hardening speed.

Further, in the case that a base-coat agent for a metal-adhered can by the above-described work is used, sufficient adhesion to metal materials of cans and amide adhesive agents can not be obtained and a suitable base-coat for short-time baking can not be obtained.

SUMMARY OF THE INVENTION

One object of the present invention is to improve hardening speed and adhesion with an aqueous resin dispersion of self-emulsive-type aromatic epoxy resin. Another object of the invention is to improve properties of adhesion and processing of painted film and to overcome sanitation problems by using a self-emulsive-type aromatic epoxy resin together with an aqueous amino resin.

In one aspect, this invention is characterized by using an acrylic resin (A), an aromatic epoxy resin (B) and a bisphenol F product (C) which is used as phenol resin in an aqueous epoxy resin dispersion of a self-emulsive-type aromatic epoxy resin that may be a phenol resin. The bisphenol F product (C) is a reaction product from bisphenol F and formaldehyde, and the bisphenol F product (C) is etherificated according to necessity shown in the following Formula (II).

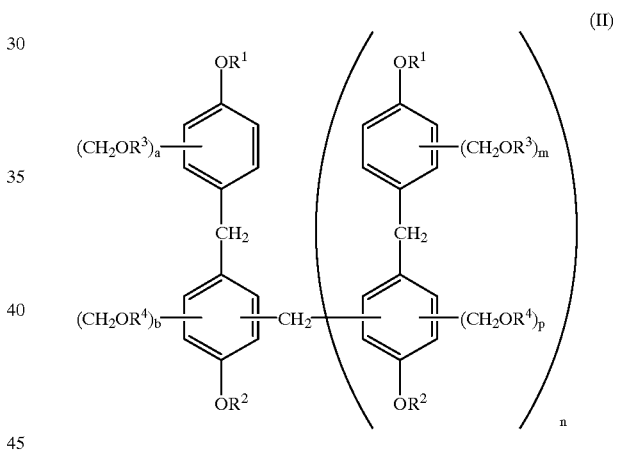

(In the above Formula (II), a, b, m and p are independently 1, 2, 3, or 4, n is 0 or an integer more than 1, $R^1$, $R^2$, $R^3$ and $R^4$ are independently hydrogen or lower alkyl group, except that at least one of $R^1$, $R^2$, $R^3$ and $R^4$ is hydrogen.)

The bisphenol F product (C) in this invention is characterized by that the content of the compound shown in the following Formula (I) wherein n=0 is less than 39 wt %, preferably 15 to less than 39 wt %, more preferably 20 to less than 39 wt %.

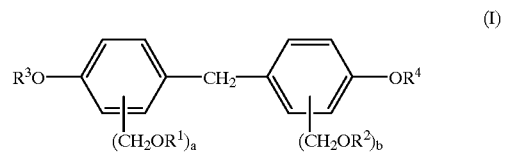

(In the above Formula (I), a and b are independently 1, 2, 3, or 4, and $R^1$, $R^2$, $R^3$ and $R^4$ are independently hydrogen or lower alkyl group, except that at least one of $R^1$, $R^2$, $R^3$ and $R^4$ is hydrogen.)

In preferred aspects, the invention provides an aqueous resin dispersion wherein acrylic resin (A), aromatic epoxy resin (B) and bisphenol F product (C) which comprises less than 39 wt % of the compound shown in Formula (I) are dispersed into an aqueous medium with ammonia or amines in order to adjust pH 4–11. Also, this invention relates to an aqueous base-coat agent comprising the present aqueous resin dispersion.

The above-mentioned resin and reaction product of this invention may be added solely in to a medium or these may be reacted further to obtain an aqueous resin dispersion. Such preparatory reaction may be performed in arbitrary combinations and order with the above-mentioned (A), (B) and (C) components. For example, the acrylic resin (A) can be reacted with the aromatic epoxy resin (B) beforehand and an obtained partial-bonded product (P) may be added to the bisphenol F product (C). These preparatory reaction may be performed with usual graft copolymerization, esterification, modified esterification and so on. Also, the acrylic resin (A) and the aromatic epoxy resin (B) may be associated and added to the bisphenol F product (C) and then dispersed.

This invention further provides an aqueous base-coat agent for metal, comprising the above aqueous resin dispersion. The aqueous base-coat agent of this invention is superior to prior agents comprising an aqueous resin dispersion of self-emulsive-type aromatic epoxy resin in properties of Peel strength, water-proof properties, corrosion resistance and flavor.

DETAILED DESCRIPTION OF THE INVENTION

Acrylic resin (A) of the present invention is obtained by the copolymerization with monomer mixture which comprises one-basic carboxylic acid monomer, such as acrylic acid and methacrylic acid, and other copolymerized monomer, in an organic solvent at 80° C. to 150° C. using an ordinary radical initiator. It is preferable that this acrylic resin (A) includes 10–70 weight % of one-basic carboxylic acid (i.e. a single COOH group) of the monomer unit in one molecule.

The above copolymerization monomer may be selected at least one kind from acrylate ester such as methyl acrylate, ethyl acrylate, isopropyl acrylate, n-butyl acrylate, isobutyl acrylate, n-amyl acrylate, isoamyl acrylate, n-hexyl acrylate, 2-ethyl hexyl acrylate, n-octyl acrylate, decyl acrylate and dodecyl acrylate; methacrylate ester such as methyl methacrylate, propyl methacrylate, n-butyl methacrylate, isobutyl methacrylate, n-amyl methacrylate, n-hexyl methacrylate, n-octyl methacrylate, 2-ethyl hexyl methacrylate, decyl methacrylate and dodecyl methacrylate; styrene monomer such as styrene, vinyltoluene, 2-methylstyrene, t-butylstyrene and chlorostyrene; monomer containing hydroxyl group such as hydroxyethyl acrylate, hydroxypropyl acrylate, hydroxyethyl methacrylate and hydroxypropyl methacrylate; N-displacement methacrylic monomer such as N-methylol methacrylamide and N-butoxymethyl methacrylamide; monomer containing epoxy group such as glycidyl acrylate and glycidyl methacrylate; acrylonitrile.

The one-basic carboxylic acid monomer is preferably used in amounts of 10–70 weight %, more preferably 20–50 weight %. If the amount is lower than 10 weight %, dispersion stability of resin in aqueous medium, adhesion of painted film to metal, solvent-resistance and/or flavor aptitude can deteriorate. If the amount is higher than 70 weight %, water-resistance and boil-resistance can deteriorate.

The number average molecular weight of the acrylic system resin (A) is preferably 2,000–100,000, more preferably 5,000–50,000. If the number average molecular weight is less than 2,000, the crosslinked density of the paints is increased and, as the result, the processing becomes difficult. If the amount is lager than 50,000, particularly 100,000, gels may be generated in the reaction with aromatic system epoxy resin (B).

It is preferable that aromatic epoxy resin (B) in this invention is obtained by the condensation of phenols such as bisphenol A and bisphenol F with epihalohydrin in the presence of an alkali catalyst. The aromatic epoxy resin (B) has preferably an average of 0.2–1.5 of epoxy group per molecular, more preferably 0.4–1.2 of epoxy group, still more preferably 0.4–1.0 of epoxy group. The number average molecular weight of the resin (B) is preferably more than 300, more preferably 900, still more preferably more than 2,000, particularly preferably 2,000–20,000, for practical using.

The following commercial products may be used as the aromatic epoxy resin (B) of this invention; Epicoat 828, Epicoat 1001, Epicoat 1004, Epicoat 1007, Epicoat 1009, Epicoat 1010, Epicoat 4009, Epicoat 4010 (Shell Chemicals Co., Ltd.), PKHH (Phenoxy Associate. Co., Ltd.), and YDF 2004, ZX-1356, YP-50S and ZX-1395 (Tobu Kasei. Co., Ltd.).

And, as the aromatic epoxy resin (B), the denaturated epoxy resin which the above epoxy group is suitably reacted with the dehydrated castor oil, the fatty acid of soybean oil, the fatty acid of vegetable oil such as the fatty acid of coconut oil, or denaturaters such as bisphenol A, bisphenol F, and bisphenol F type epoxy resin.

The partially bonded product (P) may be prepared from resin (A) and the aromatic epoxy resin (B) beforehand. The preparation method of the partially bonded product is not particularly limited. The partially bonded product (P) can be obtained by the ordinary partial reaction. For example, the above-mentioned ordinary methods such as the etherification, the denaturated etherification and the graft method may be used. These reactions can be performed preferably in the hydrophilic solvent described below at 50–150° C., for 150 minutes to 5 hours.

The bisphenol F product (C) in this invention is a product obtained by the reaction of bisphenol F with a formaldehyde compound. If necessary, the product (C) may be etherificated by a normal etherification method. This product (C) can be shown as the following Formula (II). It is not necessary that each numerical value of m and p in the repeating unit of Formula (II) is always same in all the repeating units. And these values show merely hydroxyl methylation, and further etherification in a repeating unit to some extent can be suitable.

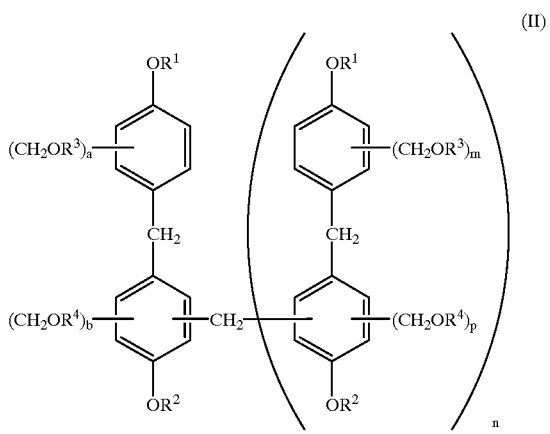

(II)

(In the above Formula (II), a and b are independently 1, 2, 3 or 4; n is 0 or an interger more than 1; $R^1$, $R^2$, $R^3$ and $R^4$ are independently hydrogen or lower alkyl group, except that at least one of $R^1$, $R^2$, $R^3$ and $R^4$ is hydrogen.)

Bisphenol F product (C) can be prepared by reacting bisphenol F with formaldehyde at 50–80° C. for 1–5 hours, preferably at 55–70° C. for 2–4 hours, condition that the mole ratio of bisphenol F to formaldehyde is 1 to 0.05–2.0, more preferably 1 to 1.0–2.0, with 0.3–2.0 mole of an alkali catalyst, preferably 1.0–2.0 mole.

And if the product (C) is etherificated further, the lower alcohol such as methanol, ethanol, propanol and butanol can be used in the etherification.

The alkali catalyst is preferably a strong base such as NaOH and KOH, or $NaCO_3$ and $NH_3$ can be used solely or together. Formalin and paraformaldehyde suitably can be used as the formaldehyde reagent.

By this reaction, the condensation reaction of bisphenol F is increased relative to hydroxyl methylation of the phenol core, and the producing monomer which is hydroxy methylated merely on the ring of bisphenol F shown in Formula (I) is comparably decreased. In preferred aspects of the invention, the amount of monomer shown in Formula (I) is less than 39 weight % to whole product, preferably 15 to less than 39 weight %, more preferably 20 to less than 39 weight %.

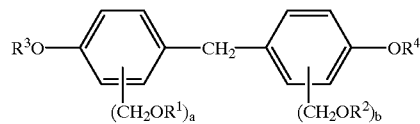

(I)

(In the above Formula (I), a and b are independently 1, 2, 3, or 4; $R^1$, $R^2$, $R^3$ and $R^4$ are independently hydrogen or lower alkyl group, except that at least one of $R^1$, $R^2$, $R^3$ and $R^4$ is hydrogen.)

Preferred compounds shown in the above Formula (I) are shown in the following Formula (III).

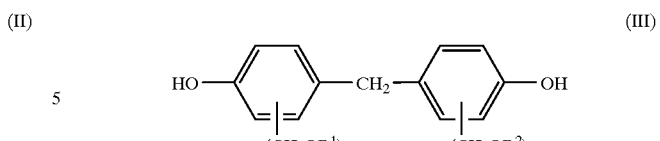

(III)

(In the above Formula (III), a and b are independently 1, 2, 3 or 4; $R^1$ and $R^2$ are independently hydrogen or lower alkyl group.)

Preferably, the hydroxyl group of phenol core in the compounds shown in the above Formula (III) is not etherificated, and more preferably both $R^1$ and $R^2$ of the compounds shown in the above Formula (III) are hydrogen, namely, the compounds are not etherificated.

The above-mentioned lower alkyl group of the ether group (i.e. $R^1$–$R^4$ in Formula I and II and $R^1$–$R^2$ in Formula III) may be an alkyl group comprising 1–10 of carbon atoms, preferably 1–7 of carbon atoms, and more preferably 1–4 of carbon atoms. For specific example, such lower alkyl group may be methyl, ethyl, n-propyl, i-propyl, butyl, n-butyl, i-butyl, sec-butyl, t-butyl, pentyl, n-pentyl, i-pentyl, neopentyl, sec-pentyl groups and so on, preferably butyl groups.

The product amount of the compound shown in the above Formula (I) of bisphenol F product (C) can be confirmed by the GPC (gel permeation chromatography) measurement method. Methylol concentration can be confirmed by a nuclear magnetic resonance method.

The usage weight ratio of bisphenol F product (C) to acrylic resin is suitably about 0.2–0.3, preferably 0.2–2.0, more preferably 0.4–1.5.

The usage ratio of the acrylic resin (A) to aromatic epoxy resin (B) is suitably in the range of from 2 to 1 to 1 to 6 at solid conversion. The reaction can be controlled by measurement oxosilane percentage, viscometric measurement or the molecular weight distribution measurement using gel permeation chromatography (GPC).

The final content amount ratio of oxosilane group of the partial reactant is 5–95%, preferably 30–70% which is the reduction ratio of the aromatic epoxy resin to the oxosilane content amount. If the reduction ratio of the oxosilane groups is less than 5%, the partial reactant of acrylic resin-aromatic epoxy resin tends to separate during storage because the partial reactant may not self-emulsificate sufficiently in an aqueous solution. If the reduction ratio is more than 95%, the property of processing of painted film tends to deteriorate.

The aqueous dispersion in this invention can be dispersed in an aqueous solution after adding ammonium or amines to superfluous carboxyl groups complex resin composite (D). The addition amount of ammonium or amines is to the extent of pH 4–11 of the final composite. As the above-mentioned amines the following suitably may be used: alkyl amine group such as trimethyl amine, triethyl amine and butyl amine; alcohol amine group such as 2-dimethyl amino, diethanol amine, triethanol amine and aminomethylpropanol; and morpholine; also polyhydric amine such as ethylene diamine and diethylene triamine.

The aqueous solution in this invention may be suitably water solely, or a mixture of water with a hydrophilic organic solvent, which mixture contains at least 10 wt % of water. As the hydrophilic organic solvent, the followings may be suitably used: the alkyl alcohol groups such as methanol, ethanol, n-propanol, isopropanol, n-butanol, sec-butanol, tert-butanol, and isobutanol; the ether alcohol groups such as methyl cellosolve, ethyl cellosolve, propyl cellosolve, butyl cellosolve, methyl carbitol, and ethyl carbitol; the ether ester groups such as methyl cellosolve acetate and ethyl cellosolve acetate; dioxane; dimethyl formaldehyde; and diacetone alcohol.

The aqueous resin dispersion of this invention can be used as a base-coat agent by adding surfactant and an antifoamer to improve the painting performance according to necessity. As the applied material or substrate, metal plates such as nontreated steel plates, treated steel plates, zinc plates, tin plates and so on are suitable. As the painting method, roll painting such as the natural roll coating and reverse roll coating are preferable; also dip painting, spray painting, electrochemical deposition painting, etc. can be suitable. Baking conditions after substrate application can be suitably e.g. baking and drying at 210–280° C. (plate temperature) for 10–60 seconds, or at 150–230° C. (plate temperature) for 2–30 minutes.

The aqueous resin dispersion in this invention can be used for, for example, an anti-rust primer combined with a suitable anti-rust agent, pigment, filler, etc., according to usage.

It is to be understood that the following examples are not intended to limit the scope of the present invention.

Production Example 1

Production of acrylic resin (A1) solution

| (1) Styrene | 105.0 (w/w) |
| (2) Ethyl acrylate | 105.0 (w/w) |
| (3) Methacrylic acid | 105.0 (w/w) |
| (4) Benzoyl peroxide | 3.0 (w/w) |
| (5) N-butanol | 696.4 (w/w) |
| (6) Benzoyl peroxide | 0.3 (w/w) |
| (7) Benzoyl peroxide | 0.3 (w/w) |

The above (5) n-butanol was prepared in a four-neck distillation flask and heated at 100° C. under $N_2$ gas stream, and the mixture of the above (1), (2), (3) and (4) was dropped into the flask, after 1 hour from dropping the above (6) was added, and after further 1 hour the above (7) was added into the flask, and kept for 1 hour at same temperature, and the acrylic resin (A1) solution was obtained thereby, wherein the solid content ratio was 30 wt %, the acidity was 196, and the number average molecular weight was 12,000.

Production Example 2

Production of epoxy resin (B2) solution

| (1) Epycoat 1009 (Oil Shell Epoxy Co., Ltd.) | 400.0 (w/w) |
| (2) Ethyleneglycol monobutylether | 300.0 (w/w) |
| (3) Methylethylketone | 300.0 (w/w) |

The above (1), (2) and (3) were prepared in a four-neck distillation flask and heated at 110° C. under $N_2$ gas stream to dissolve, and the acrylic resin (B1) solution was obtained thereby, wherein the solid content ratio was 40 wt %, the epoxy equivalent was 2850, and the number average molecular weight was 3750 and 1.3 of epoxy groups were in a molecule.

Production Example 3

Production of epoxy resin (B3) solution

| (1) ZX-1356 (Touto Kasei Co., Ltd.) | 400.0 (w/w) |
| (2) Ethyleneglycol monobutylether | 300.0 (w/w) |
| (3) Methylethylketone | 300.0 (w/w) |

In the same way as described in Production Example 2, the above (1), (2) and (3) were prepared in a four-neck distillation flask and heated at 110° C. under $N_2$ gas stream to dissolve, and the acrylic resin (B2) solution was obtained thereby, wherein the solid content ratio was 40 wt %, the epoxy equivalent was 27,700, and the number average molecular weight was 13,500 and 0.5 of epoxy groups were in a molecule.

Production Example 4

Production of epoxy resin (B4) solution

| (1) Phenoxy PKHH (Phenoxy Associate Co., Ltd.) | 400.0 (w/w) |
| (2) ethyleneglycol monobutylether | 300.0 (w/w) |
| (3) Methylethylketone | 300.0 (w/w) |

In the same way as described in Production Example 2, the above (1), (2) and (3) were prepared in a four-neck distillation flask and heated at 110° C. under $N_2$ gas stream to dissolve, and the acrylic resin (B3) solution was obtained thereby, wherein the solid content ratio was 40 wt %, the epoxy equivalent was 55,000, and the number average molecular weight was 10,000 and 0.2 of epoxy groups were in a molecule.

Production Example 5

Production of epoxy resin (B5) solution

| (1) Dihydroxydiphenylmethane (Bisphenol F-ST by Mitsui Toatsu Chemistry Co.) | 298.9 (w/w) |
| (2) Formalin (37% aqueous solution) | 581.6 (w/w) |
| (3) Sodium hydroxide (25% aqueous solution) | 119.6 (w/w) |

The above (1), (2) and (3) were prepared in a four-neck distillation flask, and reacted at 60° C. for 5 hours under $N_2$ gas and neutralized with HCl, and xylene/n-butanol/cyclohexane (1/1/1) and plenty of water were added, and then the mixture was left for 5 hours. And an aqueous layer containing the produced salt was separated and removed, and the layer dehydrated under reduced pressure, and bisphenol F reaction product (C1) solution was obtained thereby, wherein solid content ratio was about 35 wt %. As the results of measuring molecular amount with GPC, the product (C1) comprised 30 wt % of monomer which was introduced from methylol, 20 wt % of dimer which was introduced from methylol, 20 wt % of trimer which was introduced from methylol and 30 wt % of tetramer or more.

Production Example 6

Production of epoxy resin (B6) solution

| (1) Dihydroxydiphenylmethane (Bisphenol F-ST by Mitsui Toatsu Chemistry Co.) | 298.9 (w/w) |
| (2) Formalin (37% aqueous solution) | 581.6 (w/w) |

| (3) Sodium hydroxide (25% aqueous solution) | 119.6 (w/w) |
| (4) Ammonia | 10.4 (w/w) |

In the same way as described in Production Example 5, the above (1), (2), (3) and (4) were prepared in a four-neck distillation flask, and reacted at 70° C. for 3 hours under $N_2$ gas and neutralized with HCl, and xylene/n-butanol/cyclohexane (1/1/1) and plenty of water were added, and then the mixture was left for 5 hours. And an aqueous layer containing the produced salt was separated and removed, and the layer dehydrated under reduced pressure, and bis-phenol F reaction product (C2) solution was obtained thereby, wherein solid content ratio was about 35 wt %. As the results of measuring molecular amount with GPC, the product (C2) comprised 20 wt % of monomer which was introduced from methylol, 15 wt % of dimer which was introduced from methylol, 25 wt % of trimer which was introduced from methylol and 40 wt % of tetramer or more.

Production Example 7

Production of bis-phenol F reaction product (C3) solution

| (1) Dihydroxydiphenylmethane (Bisphenol F-ST by Mitsui Toatsu Chemistry Co.) | 298.9 (w/w) |
| (2) Formalin (37% aqueous solution) | 581.6 (w/w) |
| (3) Sodium hydroxide (25% aqueous solution) | 119.6 (w/w) |

The above (1), (2) and (3) were prepared in a four-neck distillation flask, and reacted at 60° C. for 5 hours under $N_2$ gas and neutralized with HCl, and xylene/n-butanol/cyclohexane (1/1/1) and plenty of water were added, and then the mixture was left for 5 hours. And an aqueous layer containing the produced salt was separated and removed, and the layer dehydrated under reduced pressure, and reacted at 100° C. for 3 hours, and butyletherificated, and bis-phenol F reaction product (C3) solution was obtained thereby, wherein solid content ratio was about 35 wt %. As the results of measuring molecular amount with GPC, the product (C3) comprised 25 wt % of monomer which was introduced from methylol, 25 wt % of dimer which was introduced from methylol, 20 wt % of trimer which was introduced from methylol and 30 wt % of tetramer or more.

Production Example 8

Production of bis-phenol F reaction product (C4) solution

| (1) Dihydroxydiphenylmethane (Bisphenol F-ST by Mitsui Toatsu Chemistry Co.) | 171.7 (w/w) |
| (2) Formalin (37% aqueous solution) | 555.0 (w/w) |
| (3) Sodium hydroxide (25% aqueous solution) | 273.9 (w/w) |

In the same way as described in Production Example 5, the above (1), (2) and (3) were prepared in a four-neck distillation flask, and reacted at 50° C. for 2 hours under $N_2$ gas and neutralized with HCl, and xylene/n-butanol/cyclohexane (1/1/1) and plenty of water were added, and then the mixture was left for 5 hours. And an aqueous layer containing the produced salt was separated and removed, and the layer dehydrated under reduced pressure, and bis-phenol F reaction product (C4) solution was obtained thereby, wherein solid content ratio was about 35 wt %. As the results of measuring molecular amount with GPC, the product (C4) comprised 45 wt % of monomer which was introduced from methylol, 25 wt % of dimer which was introduced from methylol, 20 wt % of trimer which was introduced from methylol and 10 wt % of tetramer or more.

Production Example 9

Production of bis-phenol F reaction product (C5) solution

| (1) Dihydroxydiphenylmethane (Bisphenol F-ST by Mitsui Toatsu Chemistry Co.) | 190.5 (w/w) |
| (2) Formalin (37% aqueous solution) | 542.0 (w/w) |
| (3) Sodium hydroxide (25% aqueous solution) | 267.5 (w/w) |

In the same way as described in Production Example 5, the above (1), (2) and (3) were prepared in a four-neck distillation flask, and reacted at 50° C. for 2 hours under $N_2$ gas and neutralized with HCl, and xylene/n-butanol/cyclohexane (1/1/1) and plenty of water were added, and then the mixture was left for 5 hours. And an aqueous layer containing the produced salt was separated and removed, and the layer dehydrated under reduced pressure, and bis-phenol F reaction product (C5) solution was obtained thereby, wherein solid content ratio was about 35 wt %. As the results of measuring molecular amount with GPC, the product (C4) comprised 75 wt % of monomer which was introduced from methylol, 15 wt % of dimer which was introduced from methylol and 10 wt % of trimer which was introduced from methylol.

EXAMPLE 1

| (1) Acrylic resin (A1 above) solution | 150.0 (w/w) |
| (2) Epoxy resin (B1 above) solution | 450.0 (w/w) |
| (3) Dimethylaminoethanol | 1.4 (w/w) |
| (4) Dimethylaminoethanol | 7.0 (w/w) |
| (5) Ion-exchange water | 1000.0 (w/w) |
| (6) Bisphenol F product (C1 above) solution | 71.4 (w/w) |
| (7) Ethyleneglycol monobutylether | 80.0 (w/w) |
| (8) Ion-exchange water | 200.0 (w/w) |

The above (1), (2) and (3) were prepared in a four-neck distillation flask and heated at 110° C. for 3 hours to react, and the mixture was cooled at 60° C., and the above (4) was added and stirred well, and (5) was added gradually, and the above (6) was added. After solvents and water were extracted at 50–60° C. under vacuum, the above (7) was added the mixture, and the solid content ratio was adjusted by the above (8), and the aqueous dispersion component was obtained thereby, wherein 8 wt % of containing ratio of the solvent which was bonded partially with the epoxy group having an average of 1.3 per molecule, and 25 wt % of solid content ratio.

EXAMPLE 2

| (1) Acrylic resin (A1 above) solution | 83.3 (w/w) |
| (2) Epoxy resin (B1 above) solution | 250.0 (w/w) |
| (3) Dimethylaminoethanol | 1.2 (w/w) |
| (4) Epoxy resin (B2 above) solution | 250.0 (w/w) |
| (5) Dimethylaminoethanol | 3.9 (w/w) |
| (6) Ion-exchange water | 1000.0 (w/w) |
| (7) Bisphenol F product (C1 above) solution | 71.4 (w/w) |
| (8) Ethyleneglycol monobutylether | 80.0 (w/w) |
| (9) Ion-exchange water | 200.0 (w/w) |

The above (1), (2) and (3) were prepared in a four-neck distillation flask and heated at 110° C. for 3 hours to react, and the above (4) was added and (5) was added and stirred well, and the above (6) was added gradually, and (7) was added also. After solvents and water were extracted at 50–60° C. under vacuum, the above (8) was added the mixture, and the solid content ratio was adjusted by the above (9), and the aqueous dispersion component was obtained thereby, wherein 8 wt % of containing ratio of the solvent which was bonded partially with the epoxy group having an average of 0.9 per molecule, and 25 wt % of solid content ratio.

EXAMPLE 3

| | |
|---|---|
| (1) Acrylic resin (A1 above) solution | 52.3 (w/w) |
| (2) Epoxy resin (B1 above) solution | 157.0 (w/w) |
| (3) Dimethylaminoethanol | 0.7 (w/w) |
| (4) Epoxy resin (B3 above) solution | 363.3 (w/w) |
| (5) Dimethylaminoethanol | 4.1 (w/w) |
| (6) Ion-exchange water | 1000.0 (w/w) |
| (7) Bisphenol F product (C1 above) solution | 71.4 (w/w) |
| (8) Ethyleneglycol monobutylether | 80.0 (w/w) |
| (9) Ion-exchange water | 200.0 (w/w) |

In the same way as described in Example 2, the aqueous dispersion component was obtained thereby, wherein 8 wt % of containing ratio of the solvent which was bonded partially with the epoxy group having an average of 0.5 per molecule, and 25 wt % of solid content ratio.

EXAMPLE 4

| | |
|---|---|
| (1) Acrylic resin (A1 above) solution | 150.0 (w/w) |
| (2) Epoxy resin (B1 above) solution | 450.0 (w/w) |
| (3) Dimethylaminoethanol | 1.4 (w/w) |
| (4) Dimethylaminoethanol | 7.0 (w/w) |
| (5) Ion-exchange water | 1000.0 (w/w) |
| (6) Bisphenol F product (C2 above) solution | 71.4 (w/w) |
| (7) Ethyleneglycol monobutylether | 80.0 (w/w) |
| (8) Ion-exchange water | 200.0 (w/w) |

In the same way as described in Example 1, the aqueous dispersion component was obtained thereby, wherein 8 wt % of containing ratio of the solvent which was bonded partially with the epoxy group having an average of 1.3 per molecule, and 25 wt % of solid content ratio.

EXAMPLE 5

| | |
|---|---|
| (1) Acrylic resin (A1 above) solution | 150.0 (w/w) |
| (2) Epoxy resin (B1 above) solution | 250.0 (w/w) |
| (3) Dimethylaminoethanol | 1.2 (w/w) |
| (4) Epoxy resin (B2 above) solution | 250.0 (w/w) |
| (5) Dimethylaminoethanol | 3.9 (w/w) |
| (6) Ion-exchange water | 1000.0 (w/w) |
| (7) Bisphenol F product (C2 above) solution | 71.4 (w/w) |
| (8) Ethyleneglycol monobutylether | 80.0 (w/w) |
| (9) Ion-exchange water | 200.0 (w/w) |

The above (1), (2) and (3) were prepared in a four-neck distillation flask and heated at 110° C. for 3 hours to react, and the above (4) was added and (5) was added and stirred well, and the above (6) was added gradually, and (7) was added also. After solvents and water were extracted at 50–60° C. under vacuum, the above (8) was added the mixture, and the solid content ratio was adjusted by the above (9), and the aqueous dispersion component was obtained thereby, wherein 8 wt % of containing ratio of the solvent which was bonded partially with the epoxy group having an average of 0.9 per molecule, and 25 wt % of solid content ratio.

EXAMPLE 6

| | |
|---|---|
| (1) Epycoat 1009 (Oil Shell Epoxy Co.) | 180.0 (w/w) |
| (2) Ethyleneglycol monobutylether | 90.0 (w/w) |
| (3) Methacrylic acid | 1.0 (w/w) |
| (4) Sodium hydroxide | 0.1 (w/w) |
| (5) Hydroquinone | 0.002 (w/w) |
| (6) N-butanol | 130.0 (w/w) |
| (7) Styrene | 15.8 (w/w) |
| (8) Ethyl acrylate | 15.8 (w/w) |
| (9) Methacrylic acid | 13.5 (w/w) |
| (10) N-butanol | 45.1 (w/w) |
| (11) Azobisisobutyronitrile | 2.3 (w/w) |
| (12) Azobisisobutyronitrile | 0.2 (w/w) |
| (13) Azobisisobutyronitrile | 0.2 (w/w) |
| (14) Dimethylaminoethanol | 11.2 (w/w) |
| (15) Ion-exchange water | 1000.0 (w/w) |
| (16) Bisphenol F product (C1) solution | 71.4 (w/w) |
| (17) Ethyleneglycol monobutylether | 80.0 (w/w) |
| (18) Ion-exchange water | 200.0 (w/w) |

The above (1) to (5) were prepared in a four-neck distillation flask and the interior temperature was increased to 120–130° C., and the mixture was reacted under nitrogen gas stream, and cooled at the point that the acid value of the mixture was less than 0.2, and (6) was added at 100° C., and the mixture solution of the above (7) to (11) was added over 2 hours while maintaining the temperature at 100° C. and stirring. After 1 hour after that addition, the above (12) was added, and after a further 1 hour the above (13) was added, and stirred for 1 hour while maintaining the same temperature, and then the mixture was cooled to 50° C. Continuously, the above (14) was added, and the above (15) was added gradually with stirring, and the above (16) was added. After solvents and water were extracted at 50–60° C. under vacuum, and the above (17) was added, and the solid content ratio was adjusted by the above (18), and the aqueous dispersion component was obtained thereby, wherein 8 wt % of containing ratio of the solvent which was bonded partially with the epoxy group having an average of 1.1 per molecule, and 25 wt % of solid content ratio.

EXAMPLE 7

| | |
|---|---|
| (1) Epycoat 1009 (Oil Shell Epoxy Co.) | 180.0 (w/w) |
| (2) Ethyleneglycol monobutylether | 100.0 (w/w) |
| (3) N-butanol | 80.0 (w/w) |
| (4) Styrene | 15.8 (w/w) |
| (5) Ethyl acrylate | 15.8 (w/w) |
| (6) Methacrylic acid | 13.5 (w/w) |
| (7) N-butanol | 45.1 (w/w) |
| (8) Benzoyl peroxide | 3.6 (w/w) |
| (9) Benzoyl peroxide | 0.4 (w/w) |
| (10) Benzoyl peroxide | 0.4 (w/w) |
| (11) Dimethylaminoethanol | 11.2 (w/w) |
| (12) Ion-exchange water | 1000.0 (w/w) |
| (13) Bisphenol P product (C1 above) solution | 71.4 (w/w) |
| (14) Ethyleneglycol monobutylether | 80.0 (w/w) |
| (15) Ion-exchange water | 200.0 (w/w) |

The above (1) to (3) were prepared in a four-neck distillation flask and the interior temperature was increased to 11° C., and dissolved under nitrogen gas stream, and the mixture solution of the above (4) to (8) was added over 2 hours at 110° C., and, after 1 hour from that addition, the above (9) was added, and after further 1 hour the above (10) was added, and the mixture stirred for 1 hour while maintaining the same temperature, and then the mixture was cooled at 50° C. Continuously, the above (11) was added, and the above (12) was added gradually with stirring, and the above (13) was added. After solvents and water were extracted at 50–60° C. under vacuum, and the above (14) was added, and the solid content ratio was adjusted by the above (15), and the aqueous dispersion component was obtained thereby, wherein 8 wt % of containing ratio of the solvent which was bonded partially with the epoxy group having an average of 1.3 per molecule, and 25 wt % of solid content ratio.

EXAMPLE 8

| | |
|---|---|
| (1) Acrylic resin (A1 above) solution | 52.3 (w/w) |
| (2) Epoxy resin (B1 above) solution | 157.0 (w/w) |
| (3) Dimethylaminoethanol | 0.7 (w/w) |
| (4) Epoxy resin (B3 above) solution | 366.3 (w/w) |
| (5) Dimethylaminoethanol | 4.1 (w/w) |
| (6) Ion-exchange water | 1000.0 (w/w) |
| (7) Bisphenol F product (C3 above) solution | 71.4 (w/w) |
| (8) Ethyleneglycol monobutylether | 80.0 (w/w) |
| (9) Ion-exchange water | 200.0 (w/w) |

In the same way as described in Example 2, the aqueous dispersion component was obtained thereby, wherein 8 wt % of containing ratio of the solvent which was bonded partially with the epoxy group having an average of 0.5 per molecule, and 25 wt % of solid content ratio.

Comparative Example 1

| | |
|---|---|
| (1) Acrylic resin (A1 above) solution | 150.0 (w/w) |
| (2) Epoxy resin (B1 above) solution | 450.0 (w/w) |
| (3) Dimethylaminoethanol | 1.4 (w/w) |
| (4) Dimethylaminoethanol | 7.0 (w/w) |
| (5) Ion-exchange water | 1000.0 (w/w) |
| (6) Bisphenol F product (C4 above) solution | 71.4 (w/w) |
| (7) Ethyleneglycol monobutylether | 80.0 (w/w) |
| (8) Ion-exchange water | 200.0 (w/w) |

The above (1), (2) and (3) were prepared in a four-neck distillation flask and heated at 110° C. for 3 hours to react, and the mixture was cooled at 60° C., and the above (4) was added and stirred well, and (5) was added gradually, and the above (6) was then added. After solvents and water were extracted at 50–60° C. under vacuum, the above (7) was added the mixture, and the solid content ratio was adjusted by the above (8), and the aqueous dispersion component was obtained thereby, wherein 8 wt % of containing ratio of the solvent which was bonded partially with the epoxy group having an average of 1.3 per molecule, and 25 wt % of solid content ratio.

Comparative Example 2

| | |
|---|---|
| (1) Acrylic resin (A1 above) solution | 150.0 (w/w) |
| (2) Epoxy resin (B1 above) solution | 450.0 (w/w) |
| (3) Dimethylaminoethanol | 1.4 (w/w) |
| (4) Dimethylaminoethanol | 7.0 (w/w) |
| (5) Ion-exchange water | 1000.0 (w/w) |
| (6) Bisphenol F product (C5 above) solution | 71.4 (w/w) |
| (7) Ethyleneglycol monobutylether | 80.0 (w/w) |
| (8) Ion-exchange water | 200.0 (w/w) |

The above (1), (2) and (3) were prepared in a four-neck distillation flask and heated at 110° C. for 3 hours to react, and the mixture was cooled at 60° C., and the above (4) was added and stirred well, and (5) was added gradually, and the above (6) was added. After solvents and water were extracted at 50–60° C. under vacuum, the above (7) was added the mixture, and the solid content ratio was adjusted by the above (8), and the aqueous dispersion component was obtained thereby, wherein 8 wt % of containing ratio of the solvent which was bonded partially with the epoxy group having an average of 1.3 per molecule, and 25 wt % of solid content ratio.

Performance Assessment

The aqueous dispersion components obtained by Examples 1–8 and Comparative Examples 1 and 2 were evaluated about the storage stability as paints, and also some properties of the painted film on plates prepared with the below-described conditions for the assessment. The results of this assessment are shown in Table 1 below.

Preparation Conditions for Plate

To prepare the plate for the present Assessment, firstly a certain appropriate base-coat was painted with 2.5–3.0 $\mu$m of thickness on each of a steel plate which had 0.22 m of thickness and were treated by chrome, and the obtained aqueous dispersion components were painted by roller painting on the base-coat treated plates respectively, and then baked and dried for 25 seconds at 250° C. of plate temperature.

The results shown in Table 1 were obtained by the below-described assessments methods.

1. Storage Stability of Paints

The prepared paints were stored in incubators at 50° C., and their external appearances and properties were evaluated periodically.

"o" shows the good stability, and

"x" shows that gelation, sedimentation, separation and so on appeared during storage.

2. Peeling Test

The film of 1,2-amino lauric acid polymer which has 2.3 of the relative viscosity was caught between the plates which were painted with the obtained components respectively, and adhered by the heat pressing at 200° C. for 30 seconds, and cooled. And then the test sample flakes which had 5 mm of thick for adhering were prepared by cutting, and these test flakes were performed T-type peeling test by Schoppers fiber tensil tester at 25° C. And, as another test, the adhered test sample was dipped into 90° C. of hot water, and cooled and dried, and performed T-type peeling test.

3. Water-Proof Property

The painted surface conditions of the test samples were examined after dipping into water at 125° C. for 40 minutes.

4. Processing Property

The painted plates test samples were cut to a size of 40 mm×50 mm, and folded in two to have the outside surfaces being the painted surfaces and to have the tested portions being 40 mm in size. And aluminum plates 0.30 mm thick were caught between the folded test samples respectively, and 3 Kg of weight was dropped down to each folded portion of test sample from 45 cm of height. And then the outside of folded portion was pressed a sponge which was soaked salt solution, and the other side of the sponge was connected with a metal plate which was an electrode, and 6 V×10 seconds of electric current was sent between the metal plate and the folded portion, and after 10 seconds, the electric value between the metal plate and the folded portion was evaluated.

5. Resistance to salt solution

Each test flake which was notched "x" on the surface by knife was dipped into 125° C. of 1% salt solution for 40 minutes, and stored at 50° C. for 1 week, and the degree of corrosion at the portion near the "x"-notch was evaluated. In Table 1, "o" shows that no corrosion appeared, "Δ" shows that a little corrosion appeared and "x" shows that much corrosion appeared.

6. Resistance to flavor Inhibition

The test flake was bottled into a bottle which was made from heat-resistant glass and filled with water treated by active carbon, and bottling the ratio of water amount (ml) to the painted area (cm$^2$) was 1 to 1. A lid was placed on the bottle, and sterilized at 125° C. for 45 minutes, and the flavor of inside water was tested. In Table 1, "0" shows that the flavor did not change, "A" shows that a little change of flavor appeared and "x" shows that the flavor changed very much.

As shown in the results of assessments, the paints of the present invention are superior to the paints of Comparative Examples at, especially, resistance to corrosion, water proof performance, processing property and peel strength. Also, the paints which contain 0.2–1.0 of epoxy groups are especially superior with respect to processing properties and peel strength.

The present invention can provide the exceedingly superior base-coat paint by using bisphenol F reaction product (C) which contains less than 39 wt % of monomer as phenol resin, without deteriorating properties of prior aqueous resin dispersion of self-emulsive-type aromatic epoxy resin.

TABLE 1

|  | Storage Quality | Peel Strength (kg/5 mm) | | Water Resistance | Processing Resistance mA | Corrosion Resistance | Flavor |
| --- | --- | --- | --- | --- | --- | --- | --- |
|  |  | Initial Value | 90° C.~ 7 days |  |  |  |  |
| Ex. 1 | ○ | 4.8 | 4.3 | ○ | 49.2 | ○ | ○ |
| Ex. 2 | ○ | 6.2 | 5 | ○ | 23 | ○ | ○ |
| Ex. 3 | ○ | 5.9 | 4.9 | ○ | 27.1 | ○ | ○ |
| Ex. 4 | ○ | 4.5 | 4.3 | ○ | 48.8 | ○ | ○ |
| Ex. 5 | ○ | 5.7 | 5.3 | ○ | 20.5 | ○ | ○ |
| Ex. 6 | ○ | 4.7 | 4.5 | ○ | 55 | ○ | ○ |
| Ex. 7 | ○ | 4.8 | 4.6 | ○ | 50 | ○ | ○ |
| Ex. 8 | ○ | 6.3 | 5.4 | ○ | 19.8 | ○ | ○ |
| Comparison Ex. 1 | ○ | 1.6 | 1 | ○ | 55 | Δ | Δ |
| Comparison Ex. 2 | ○ | 0.8 | 0.5 | Δ | 58 | Δ | Δ |

The foregoing description of the invention is merely illustrative thereof, and it is understood that variations and modifications can be made without departing from the spirit or scope of the invention as set forth in the following claims.

What is claimed is:

1. An aqueous resin dispersion comprising a partial bonded component (P) which is produced from an acrylic resin (A) and an aromatic epoxy resin (B) comprising from 0.2 to 1.5 of epoxy groups per molecule, and a bisphenol F product (C) that is a reaction product of a bisphenol F compound and a formaldehyde reagent, the bisphenol F product (C) comprising from 15 wt % to less than 39 wt % relative to the reaction product of the bisphenol F compound and the formaldehyde reagent, the bisphenol compound having the following formula (I):

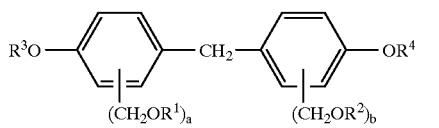

wherein in the above Formula (I), a and b are independently 1, 2, 3, or 4, and $R^1$, $R^2$, $R^3$ and $R^4$ are independently hydrogen or lower alkyl group having 1–10 carbon atoms, with that at least one of $R^1$, $R^2$, $R^3$ and $R^4$ being hydrogen, and with the acrylic resin (A), aromatic resin (B) and bis-phenol F product (C) being present in an aqueous medium having a pH of from 4 to 11.

2. The aqueous resin dispersion of claim 1, wherein the aromatic expoxy resin (B) contains from 0.4 to 1.2 of epoxy group per molecule.

3. The aqueous resin dispersion claim 1, wherein the number average molecular weight of the aromatic epoxy resin (B) is from about 2,000 to 20,000.

4. The aqueous resin dispersion of claim 1, wherein the bisphenol (C) is an etherificated compound of the following II:

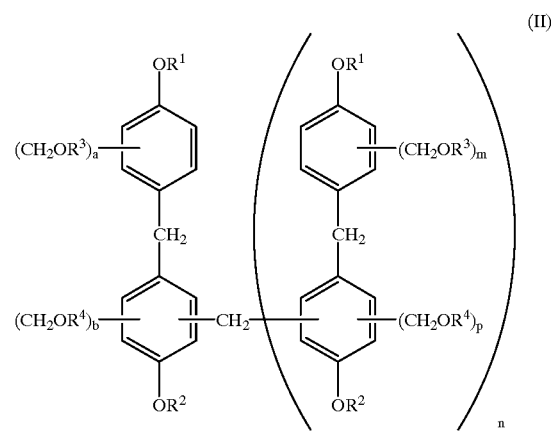

wherein a, b, m and p are independently 1, 2, 3 or 4, n is 0 or an integer of more than 1, $R^1$, $R^2$, $R^3$ and $R^4$ are independently hydrogen or a lower alkyl group having from 1–10 carbon atoms, with that at least one of $R^1$, $R^2$, $R^3$ and $R^4$ being hydrogen.

5. The aqueous dispersion of claim 1 wherein the dispersion contains ammonia or other amine to adjust the pH from 4 to 11.

6. An aqueous base-coat agent for metal that comprises the aqueous resin dispersion of claim 1.

7. A metal substrate comprising a coating layer of a resin dispersion, the resin dispersion comprising
  1) an acrylic resin (A),
  2) an aromatic epoxy resin (B) that comprises from 0.2 to 1.5 of epoxy groups per molecule, and
  3) a bis-phenol F product (C) that is a reaction product of a bisphenol F compound and a formaldehyde reagent, the bisphenol F product (C) comprising from 15 wt % to less than 39 wt % relative to the reaction product of the bisphenol F compound and the formaldehyde reagent, the bisphenol compound having the following formula (I):

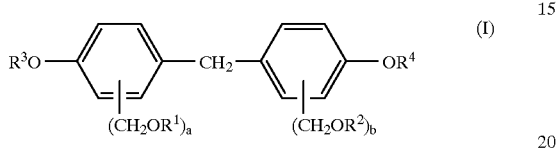

wherein in the above Formula (I), a and b are independently 1, 2, 3, or 4, and $R^1$, $R^2$, $R^3$ and $R^4$ are independently hydrogen or lower alkyl group having 1–10 carbon atoms, with that at least one of $R^1$, $R^2$, $R^3$ and $R^4$ is hydrogen,
  and with the acrylic resin (A), aromatic resin (B) and bis-phenol F product (C) being present in an aqueous medium having a pH of from 4 to 11.

8. The metal substrate of claim 7 wherein the substrate is a non-treated steel substrate, a treated steel substrate, a zinc plate or a tin plate.

9. The metal substrate of claim 7 wherein the resin dispersion is applied to the interior of a can.

10. A method of providing a coated metal substrate comprising
  (a) applying a coating layer of an aqueous resin dispersion, the aqueous resin dispersion comprising
  1) an acrylic resin (A),
  2) an aromatic epoxy resin (B) that comprises from 0.2 to 1.5 of epoxy groups per molecule, and
  3) a bis-phenol F product (C) that is a reaction product of a bisphenol F compound and a formaldehyde reagent, the bisphenol F product (C) comprising from 15 wt % to less than 39 wt % relative to the total weight of the reaction product of the bisphenol F compound and the formaldehyde reagent, the bisphenol F compound having the following formula (I):

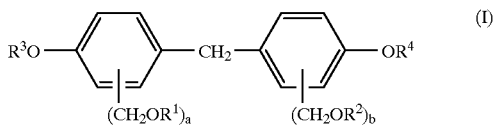

wherein in the above Formula (I), a and b are independently 1, 2, 3, or 4, and $R^1$, $R^2$, $R^3$ and $R^4$ are independently hydrogen or lower alkyl group having 1–10 carbon atoms, with that at least one of $R^1$, $R^2$, $R^3$ and $R^4$ is hydrogen, and with the acrylic resin (A), aromatic resin (B) and bis-phenol F product (C) being present in an aqueous medium having a pH of from 4 to 11; and (b) drying the applied coating layer.

11. An aqueous resin dispersion of claim 1 wherein the formaldehyde reagent is formalin or paraformaldehyde.

12. The aqueous resin dispersion of claim 1, wherein the aromatic expoxy resin (B) contains from 0.4 to 1.0 of epoxy group per molecule.

* * * * *